Sept. 5, 1933.　　　　　G. S. HULL　　　　　1,925,445
AIR MOTOR
Filed June 23, 1928　　　3 Sheets-Sheet 1

INVENTOR.
George S. Hull
BY Arthur W. Brown
ATTORNEY

Sept. 5, 1933.　　　　　G. S. HULL　　　　　1,925,445
AIR MOTOR
Filed June 23, 1928　　　3 Sheets-Sheet 2
Fig. 3.
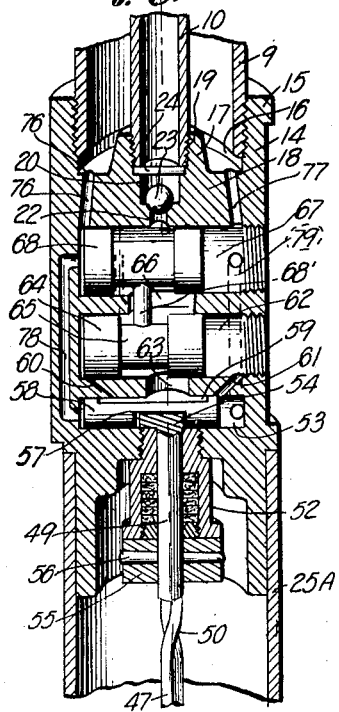
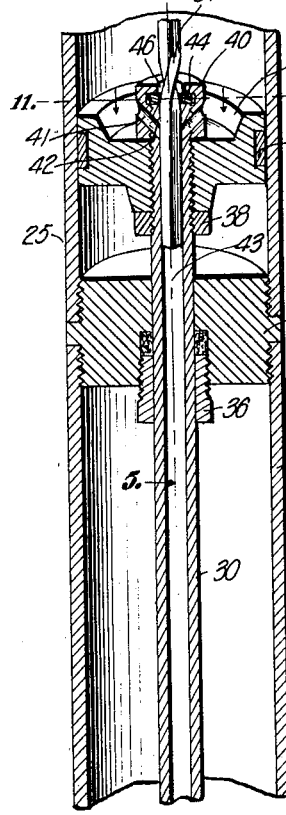
Fig. 4.
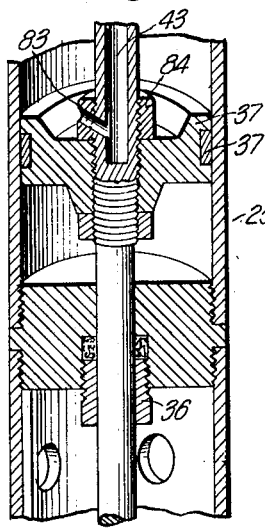
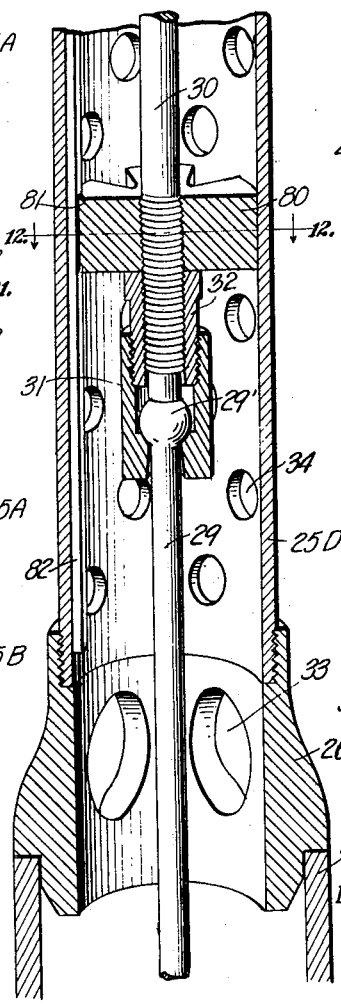
Fig. 5.
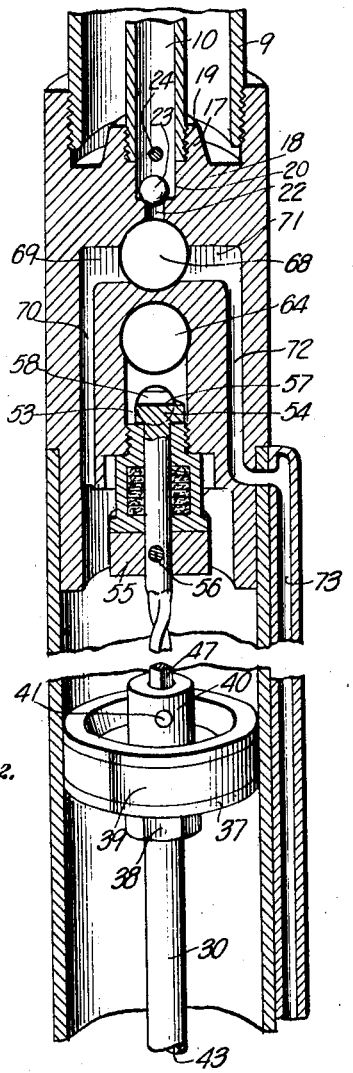
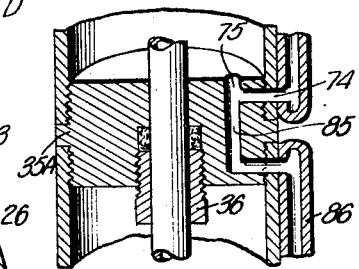
INVENTOR.
George S. Hull
ATTORNEY Sept. 5, 1933.  G. S. HULL  1,925,445
AIR MOTOR
Filed June 23, 1928   3 Sheets-Sheet 3
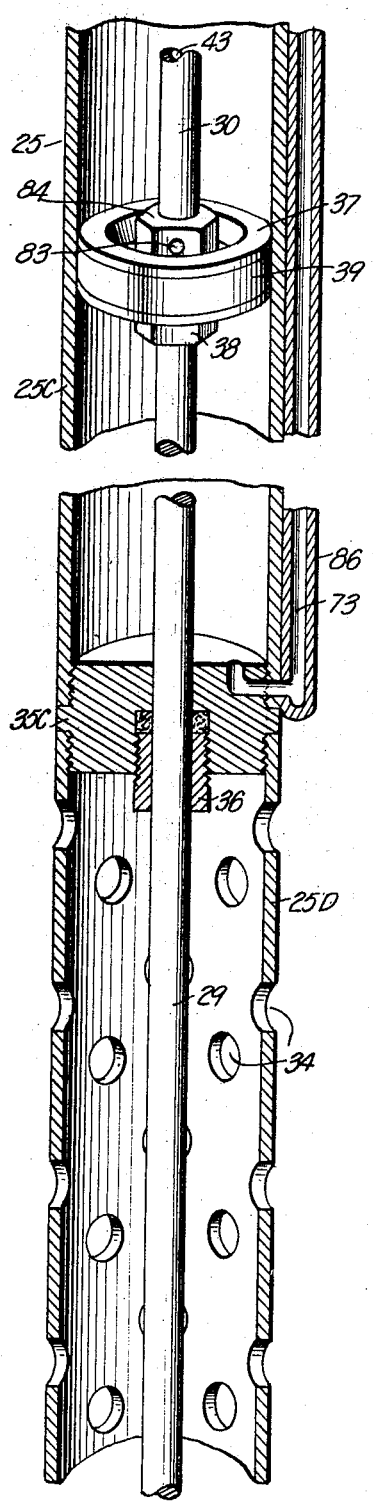
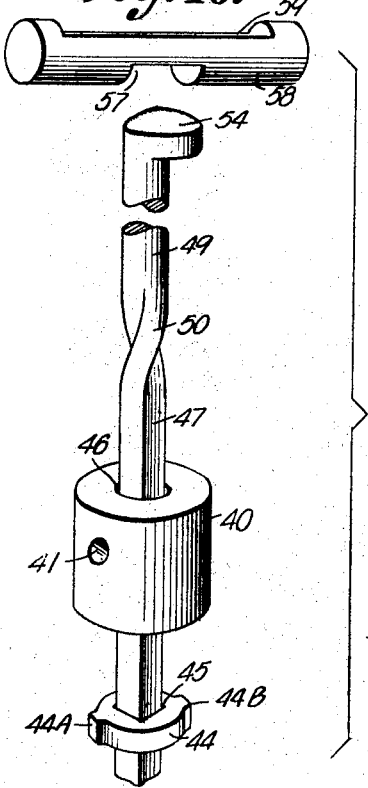
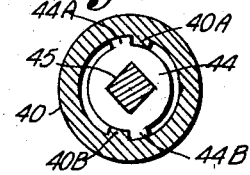
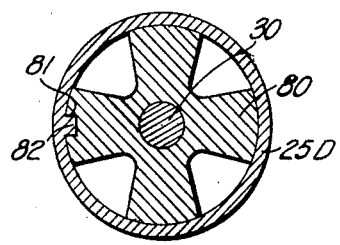
INVENTOR.
George S. Hull
BY
ATTORNEY Patented Sept. 5, 1933

1,925,445

UNITED STATES PATENT OFFICE 1,925,445

AIR MOTOR

George S. Hull, Tulsa, Okla., assignor, by direct and mesne assignments, of one-third to Irwin B. Winsor, one-sixth to O. W. Yates, and one-sixth to L. M. Freeman, all of Tulsa, Okla.

Application June 23, 1928. Serial No. 287,819

2 Claims. (Cl. 121—157)

My invention relates to air motors and more particularly to devices of that character for pumping wells; the principal object of the invention being to provide a motor operable by a fluid pressure medium, such as air, which may be located in the bottom of a well for direct operation of a plunger or like pump and wherein direction of flow of the pressure medium is automatically reversed at opposite limits of travel of the pump plunger.

It is also an object of the invention to pressure balance the flow reversing elements of the motor to facilitate their operation under the extreme pressures necessary for operation of the motor in connection with pumps of larger capacity employed in deep wells.

In accomplishing these objects I have provided the improved details of structure hereinafter described and illustrated in the accompanying drawings, wherein:

Fig. 1 is a vertical section of an oil well equipped for pumping with a motor embodying my invention; the well casing being broken away to illustrate the motor.

Fig. 2 is an enlarged, central, longitudinal section of the upper portion of the motor showing the pistons at their upper limit of travel and the valves in position for admitting air above the pistons.

Fig. 3 is a similar view, showing the parts reversed.

Fig. 4 is a similar view of the lower end of the motor, particularly illustrating a guide head for the motor piston rod and its universal connection between the motor and pump piston rods.

Fig. 5 is a vertical section on the irregular line 5—5, Fig. 3.

Fig. 6 is a vertical section of the extreme lower end of the motor.

Fig. 7 is a cross section on the line 7—7, Fig. 2, illustrating relation of the inner and exhaust ports to the upper primary valve.

Fig. 8 is a cross section on the line 8—8 of Fig. 2, illustrating the motor means for shifting the primary valve.

Fig. 9 is a cross section on the line 9—9 of Fig. 2 illustrating the shifting valve for controlling the operation of the motor means.

Fig. 10 is a detail perspective view of the shifting valve and cam rod actuating mechanism.

Fig. 11 is a cross section on the line 11—11, Fig. 3.

Fig. 12 is a cross section on the line 12—12, Fig. 4.

Referring more in detail to the drawings:—

1 designates an oil well, leading through cap rock 2 to a shot hole 3, and 4 the well casing having a shoe 5 supported in the cap rock and a casing head 6 provided with a flow line 7, in accordance with common practice.

Suspended from an air tight fitting 8 on the casing head is an air supply tube 9 which extends through the casing to near the bottom of the well, and extending through the fitting 8 and tube 9 is an air exhaust pipe 10. A line 11 leading to the tube 9 through fitting 8 may supply air under pressure from any suitable source (not shown); the supply line 11 and exhaust pipe 10 being provided respectively with valves 12 and 13 for controlling flow of air to and from the motor. The tube 9 is of substantially less diameter than the casing 4 to provide space for outlet of oil through the casing about the tubing and the pipe 10 is of substantially less diameter than the tubing to provide space for supply of air to the motor about the pipe.

Referring to the motor; 14 designates a cylindrical head or valve block provided with an annular extension 15 forming a chamber 16 and interiorly screw threaded to receive threads on the lower end of the tubing for suspending the motor, of which the head forms a part, and having a boss 17 extending outwardly from the base 18 of the chamber and provided with a socket 19 into which the lower end of the exhaust pipe 10 is threaded. A valve chamber 20 at the bottom of the socket communicates with a transverse valve chamber (presently described) through a port 22; a ball valve 23 confined in the chamber 20 by a cross bar 24 controlling the port 21.

Suspended from the head 14 is a cylinder 25, formed in sections, here shown as three in number—25A, 25B and 25C, with a terminal or coupling section 25D at its lower end, the latter connected through a reducing coupling 26, with a packer 27 which is set in the casing near the bottom of the well. Leading from the bottom of the packer is a liner 28 which connects with a pump barrel (not shown), containing a plunger (not shown) operable by a rod 29, which extends through the packer and reducing coupling into the coupling section 25D of the motor cylinder and is there connected with the motor piston rod 30 by a universal, adjustable coupling preferably including a socket 31 for the ball 29' on the pump rod and a sleeve 32 interiorly threaded on the motor piston rod and exteriorly threaded onto the socket 31 so the rods may be adjusted relative to each other by manipulation of the coupling members. With such arrangement, when the motor piston rod is reciprocated, the pump is operated to lift oil through the packer into the reducing coupling and lower section of the motor cylinder, through ports 33 and 34 in the coupling and cylinder into the well casing and up within the casing to discharge through the flow line at the top of the well.

The motor piston rod 30 extends continuously through all of the cylinder sections and through the partition blocks 35A, 35B and 35C which separate the sections (and through stuffing boxes 36 on the partition blocks) and carries pistons 37, one of which is located in each of the cylinder sections.

Referring first to the piston in the upper cylinder section, because a description of it will apply to all of the others except for certain flow reversing elements which will be mentioned, and for the further reason that it is by means operated by this piston that direction of flow of the motor operating air is reversed: 37 designates a piston threaded onto the motor piston rod 30 and held in adjusted position thereon by a lock nut 38, the periphery of the piston being provided with a sealing ring 39 in accordance with common practice.

The rod 30 extends upwardly for a short distance above the piston and threaded onto this extension is an inverted cap 40 having downwardly and inwardly disposed ports 41 in its side wall communicating with downwardly and inwardly inclined ports 42 in the motor piston rod, leading to a channel 43 provided in the rod for purposes presently described. Retained on the end of the rod 30 by the top of the cap 40 is a disk 44 having a square opening 45. Extending through an opening 46 in the top of the cap, and through the square opening 45 in the disk 44, into the channel 43 in the piston rod, is the square shank 47 of a cam rod 49 which extends throughout substantially the length of the piston chamber and has half turns or twists 50—51 near its top and bottom forming cams or worms adapted for cooperation with the disk 44 on the piston for turning the cam rod when the piston reaches the respective ends of the chamber.

As the cam disk must be operated only at the final limit of its movement in either direction, I have provided for idle movement of it over the twisted sections 50 or 51 of rod 49 upon either up or down movement of the piston by mounting it loosely in the cap 40 and providing it with ears 44A—44B which extend from the periphery of the disk at diametrically opposite points and are adapted for stop engagement with lugs 40A—40B on the inner periphery of the cap 40. With this arrangement when the piston 37 starts up from the position illustrated in Fig. 3, the disk is turned contra-clockwise by the twist 51 at the bottom of the rod until, at the end of the twist, the ears are located adjacent the lugs on the cap. The disk then slides idly over the straight part of the rod and when the upper twist is reached is held by engagement of the ears with the lugs and causes the rod 49 to turn for the purpose presently described. On return or downward movement of the piston the operation is reversed, the rod being given a half turn clockwise as the piston reaches the bottom of its chamber.

The cam rod 49 extends through a stuffing box 52 on the bottom of the cylinder head 14 into a transverse chamber 53 in the head and has a cam 54 on its upper end rotatable within the chamber 53 in a fixed plane determined by contact of the cam with the bottom of the chamber and a collar 55 pinned to the rod at 56 and bearing against the bottom of the stuffing box.

The cam 54 seats in a slot 57 in the bottom of a cylindrical shifting valve plug 58 slidable in the chamber 53 and having a longitudinal groove 59 in its upper face adapted for connection with either of the ports 60 or 61 leading to opposite ends of a chamber 62 in the cylinder head according to positions of the shifting valve plug, a central exhaust port 63 providing constant communication between the groove 59 and the chamber 62.

Slidably located within the chamber 62 is a motor means 64 having a reduced central portion 65 forming a passage-way through the chamber from port 63 to a port 66 which provides communication between the chamber 62 and a primary valve chamber 67.

Slidably located in chamber 67 for sliding movement is a primary valve plug 68 adapted to alternately cover and uncover the port 69 of a channel 70 leading through the cylinder head to the upper portion of the piston chamber (Fig. 5) above the piston 37 or the port 71 leading through a channel 72 to a conduit 73 opening to the port 74 of a channel 75 in the partition or head block 35A and opening to the lower portion of the piston chamber below the piston 37. 68' designates a link integrally connecting the valve motor means 64 and valve 68 for shifting the valve 68 when the motor means 64 is reciprocated as will presently be described.

Ports 76 and 77 provide communication between opposite ends of the primary valve chamber 67 and the chamber in the top of the cylinder head to which pressure medium for operating the motor is delivered through the tubing 9. Channels 78 and 79 provide constant communication between corresponding ends of the primary and shifting valve chambers 67 and 53 and through the ports 76 and 77 with the main receiving chamber for admitting pressure medium equally to both ends of the shifting valve chamber and thereby balancing the shifting valve plug 58 so that work of the cam is limited to that required for overcoming weight of the valve and friction of its housing. The primary valve plug 68 is likewise balanced because of constant communication between the chamber 67 and the main receiving chamber through ports 76 and 77.

Irrespective of the number of cylinder sections employed, the motor piston is adjustably connected with the pump piston rod to determine the stroke of the pump piston, preferably through the couplings 29'—31—32, in combination with a guide head 80 threaded onto the motor piston rod and having a vertical edge peripheral groove 81 seating a spline 82 on the inner wall of the cylinder section 25D.

With the parts constructed as described, and for the present disregarding the additional motor cylinder sections, the pump and motor piston rods are adjusted for a desired pump stroke by manipulation of the threaded coupling, the guide head keyed to the motor cylinder section to maintain the adjustments and the pump and motor parts, with the packer, let into the well on the end of the tubing.

Assuming that the piston 37 is at the bottom of its cylinder chamber, the shifting valve 58, motor means 64 and primary valve 68 will be in the position illustrated in Fig. 3. With the parts in this relation, air is admitted through the supply line 11 and, passing down through the tubing, enters the opposite ends of the primary valve chamber 67 through the ports 76 and 77, balancing the primary valve plug 68, and passing through the channels 78 and 79 to opposite ends of the chamber 53, balances the shifting valve plug 58. The channel 73, being open to the right-hand end of the primary valve chamber 67, provides a line of communication through the port 77, the primary valve chamber, channel 73, ports 74 and channel 75 to the lower end of the piston cylinder, so that pressure is built up in the piston cylinder beneath the piston for lifting the piston.

As the piston starts to rise, the disk 44, within the cap at the top of the piston, is turned, idling on the lower twisted portion of the rod 49. As the piston reaches the top of its chamber and engages the upper twisted portion of rod 49, the disk is locked by engagement of the ears 44A—44B with the lugs 40A—40B and the rod is turned to move the shifting valve plug 58 to the right-hand end of its chamber, covering the port 61 and uncovering the port 60, thereby establishing communication between the left-hand end of the chamber 62 and the corresponding end of the shifting valve chamber, so that air is admitted to chamber 62 back of the plug, for shifting the plug, shifting of the shifting valve plug 58 opening the right-hand end of the chamber 62 to the groove 59 in shifting valve plug 58, through the port 61, to relieve the chamber and permit shifting of the secondary value plug 64, the exhaust air passing through port 63, around the reduced portion 65 of the motor means 64, through port 66, around the reduced part of the primary valve plug 68 and out through the valve port 22 to the exhaust pipe 10. When the motor means 64 is shifted to the right it carries the primary valve plug 68 with it, uncovering the port 69 at the left-hand end of the chamber 21, so that air is admitted to the top of the piston chamber through the channel 70, movement of the primary valve plug to the right exposing the port 71 to the space about the reduced portions of the primary valve plug, so that the lower portion of the piston chamber may exhaust into said space and thence through port 22 to the exhaust pipe.

When air is admitted to the top of the piston chamber under these conditions the piston is moved downwardly, lowering the pump piston; similar successive operations of the valve mechanism inducing reciprocation of the pump piston for pumping the oil.

Upper portions of successively lower sections of the pump cylinder are supplied with air through the channel 43 of the motor piston rod 30 and ports 83 leading from said channel through lock nuts 84 on the rod 30 above the respective pistons. Lower portions of said successively lower cylinder sections are supplied with air through branches 85 of the channels 75 in the respective partitions 35A, etc., and conduits 86 leading to ports 74 and channels 75 in said partitions, so that air admitted to the right-hand end of the primary valve chamber is distributed simultaneously to all of the several motor piston chambers.

Elevation of the oil through the casing may be facilitated by delivery of part of the exhaust air from pipe 10 into the space between the tubing and casing near the top of the well. Consequently I prefer to provide the pipe 10 with an upturned nozzle 87 through which the air, exhausting through pipe 10, may be diverted into the oil for aerating the oil, to assist in its delivery from the well.

What I claim and desire to secure by Letters Patent is:

1. In combination with a power cylinder, a piston in said cylinder, a head on said cylinder in substantially concentric relation with the cylinder, primary valve mechanism in said head for directing flow of fluid pressure medium alternately to opposite ends of the cylinder, and means for directing flow of said pressure medium for actuating said primary valve mechanism including a reciprocating valve member transversely slidable in said head, an axially pivoted rod operably connected with said valve member and extending through and reversely operable by said piston at opposite ends of the piston stroke.

2. Apparatus of the character described including a cylinder, a head on the cylinder having parallel primary valve, motor means and shifting valve chambers in transverse relation to the cylinder and arranged one above the other, a primary valve, a motor means and a shifting valve in the respective chambers, a pressure medium supply conduit having branches leading progressively through the primary, shifting valve and motor means chambers, an exhaust conduit communicating with the chambers, a piston in the cylinder, conduits leading from the primary valve chamber into said cylinder above and below the piston, and means operably connecting the piston and shifting valve for shifting said last named valve in response to reciprocation of the piston to effect actuation of the motor means and primary valve for alternately directing said medium to opposite ends of the piston.

GEORGE S. HULL.